UNITED STATES PATENT OFFICE 2,617,795

METHOD OF PREPARING AMIDES

James R. Vaughan, Jr., Glenbrook, Conn., assignor to American Cyanamid Company, New York, N. Y., a corporation of Maine No Drawing. Application February 1, 1951, Serial No. 208,987

17 Claims. (Cl. 260—112)

This invention relates to a new method of organic synthesis, and more particularly, to a new method of preparing substituted amides and peptides.

The new method of this invention broadly comprises reacting a carboxylic acid with a diesterarseniteamide as illustrated by the following general equation:

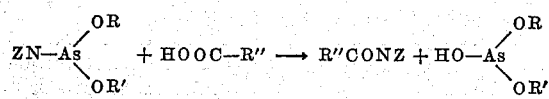

in which ZN is a radical obtained from a primary or secondary amine, R and R' are the same or different esterifying radicals, and R'' is an organic radical capable of being attached to a carboxyl group. As may be seen from this equation, the method is a general one suitable for the preparation of many mono and disubstituted amides.

Diesterarseniteamides, which may also be referred to as aminoarsenites, constitute the subject matter of my copending U. S. application S. N. 208,986, filed concurrently herewith and may be prepared by the procedure set forth in detail therein. Any aminoarsenite is suitable for the process of this invention, however, as pointed out in my above-mentioned co-pending application, aminoarsenites of amines having a dissociation constant less than $1 \times 10^{-13}$, for instance secondary aromatic amines, cannot readily be prepared. Also, it might be mentioned, that aromatic esters of the arseniteamides are sometimes more difficult to prepare than lower alkyl, for instance ethyl, propyl and amyl, or monocyclic aralkyl, for instance benzyl. However, once prepared, any aminoarsenite is quite satisfactory as the groups represented by R and R' may be varied within wide limits without appreciably affecting the reactivity of the aminoarsenite with carboxylic acids.

The particular aminoarsenite employed depends upon the substituted amide desired as may be seen from the above general equation. If a monosubstituted amide is desired, there is employed an aminoarsenite derivative of a primary amine as illustrated by the following: aliphatic amines, for instance methylamine, ethylamine, propylamine, hexylamine, allylamine; subsituted aliphatic amines, for instance chloroethylamine, phenylethylamine, and benzylamine; aromatic amines, for instance aniline and naphthylamine; substituted aromatic amines, for instance m-toluidine, p-benzylaniline and o-chloroaniline; heterocyclic amines, for instance aminopyrimidine. If a disubstituted amide is desired, there is employed an aminoarsenite derivative of a secondary amine as illustrated by the following: aliphatic amines, for instance dimethyl amine and dibutyl amine; mixed aliphatic-aromatic amines, for instance N-allylaniline and benzylaniline; cyclic amines, for instance piperidine and morpholine.

Any dibasic or polybasic carboxylic acid is suitable for the process of this invention. The following specific examples may be given by way of illustration: aliphatic carboxylic acids, for instance acetic, propionic, butyric, caproic, stearic and oleic; substituted aliphatic acids, for instance monochloroacetic; polybasic acids, for instance succinic and adipic; aromatic acids, for instance benzoic and naphthalic; heterocyclic acids, for instance nicotinic and thiophene carboxylic; alicyclic acids, for instance cyclohexanecarboxylic acid. When dibasic acids are employed in the process, either the monoamide or the diamide may be prepared depending upon the number of molar equivalents of aminoarsenite used.

The method of this invention is of particular interest in the preparation of amides from derivatives of the naturally occurring aminoacids. According to many of the methods of the prior art, when amides were made from the optically active acids, a large amount of racemization occurred, but by the method of this invention very little difficulty is encountered. The aminoacid derivative may constitute either the amine from which the aminoarsenite is formed or the carboxylic acid which is reacted with the aminoarsenite to form the substituted amide.

In making aminoarsenites in which the amine group is to be furnished by an aminoacid, the carboxy group of the aminoacid should be blocked to prevent side reactions. Likewise, in the synthesis of peptides where the aminoarsenite is to be reacted with the carboxy group of an aminoacid, the amine group of the aminoacid should be blocked to prevent the formation of zwitterions. The procedure of blocking a reactive group is well known in the art and in the case of carboxy groups may be done by esterification or the equivalent and in the case of amine groups may be done by acylation or the equivalent.

Illustrative of the naturally occurring aminoacids the derivatives of which are of particular interest in connection with this invention are the following: alanine, valine, norvaline, leucine, norleucine, isoleucine, phenylalanine, tyrosine, serine, cysteine, methionine, aspartic acid, glutamic acid, lysine, ornithine, asparagine, histidine, and tryptophane. Generally speaking these aminoacids are alpha aminoacids having from two to twelve carbon atoms.

The method offers a very convenient means of preparing long chain polypeptides. For instance, the dipeptide ester derivative may be prepared by reacting an acylated aminoacid with an aminoarsenite formed from an aminoacid ester. The ester group of the dipeptide may then be removed to form the free acid which is then reacted with more aminoarsenite to form the tripeptide ester and so on. Of course, part of the dipeptide above may also be used in making an aminoarsenite which may be reacted with more of the dipeptide to form the tetrapeptide. By such methods an endless variety of mixed peptides of assorted aminoacids may be formed.

The reaction is preferably performed in an inert solvent. Suitable inert solvents may be illustrated by the following: aromatic hydrocarbons, for instance toluene, and xylene; aliphatic hydrocarbons, for instance normal octane; chlorinated hydrocarbons, for instance chloroform, carbon tetrachloride, and chlorobenzene; aliphatic ethers, for instance ethyl ether; cyclic ethers, for instance dioxane; and with less satisfactory results, aliphatic ketones, for instance dibutyl ketone and aliphatic esters, for instance ethyl acetate. Choice of solvent will depend primarily upon the solubility of the reactants therein and upon convenience. The aromatic hydrocarbons are preferred. When an inert solvent is employed, the aminophosphite may be formed in situ without the need of isolation.

The reaction may be carried out at room temperature or at any other temperature below the decomposition point of the reactants or reaction product. Usually, however, one is limited as a matter of convenience to the reflux temperature of the solvent employed, for instance 138° C. in the case of xylene and temperatures in the range of 40–110° C. are preferred. The reaction proceeds immediately at room temperature and is substantially complete within about forty-eight hours. The reaction is usually complete in about thirty minutes to one hour at 110° C., and in a proportional length of time at intermediate temperatures.

The new method of this invention offers many advantages over the methods of the prior art. For instance the new method may be employed in the preparation of amides containing sensitive groups such as aldehyde and keto groups which ordinarily interfere with the synthesis of amides. The new method may be employed in preparing optically active amides from optically active components where other methods result in undue racemization. Also, by this method, amides of the aminoacids are produced in such pure form that in many instances they crystallize from the reaction mixture where the methods of the prior art result in oils.

The process will be more particularly illustrated by means of the following specific examples, in which all parts are by weight unless otherwise specified:

*Example I*

To a solution of 1.86 parts by weight of aniline and 2.04 parts by weight of triethylamine in 50 parts by volume of toluene there is added 4.01 parts by weight of chlorodiethylarsenite. An exothermic reaction occurs resulting in an immediate precipitate of triethylamine hydrochloride. The triethylamine hydrochloride is removed by filtration and the filtrate concentrated by vacuum distillation to give anilinodiethylarsenite as a light yellow oil.

To 4.3 parts by weight of anilinodiethylarsenite there is added 3.5 parts by weight of carbobenzoxyglycine and the mixture heated in the absence of a solvent to form a clear melt. After two to three minutes the liquid is cooled causing rapid crystallization. The solid product is washed with dilute sodium bicarbonate, followed by water, and is then recrystallized from methanol. The resulting carbobenzoxyglycylanilide has a melting point of about 143–144° C.

*Example II*

To a solution of 4.59 parts by weight of ethyl dl-phenylalanate hydrochloride and 4.08 parts by weight of triethylamine in 50 parts by volume of chloroform there is added 50 parts by volume of ether and the resulting precipitate of triethylamine hydrochloride removed by filtration. To the clear filtrate there is added a solution of 4.01 parts by weight of chlorodiethylarsenite in 10 parts by volume of ether. After about ten minutes the mixture is again filtered to remove precipitated triethylamine hydrochloride and the clear filtrate concentrated by vacuum distillation to yield diethyl-alpha-carbethoxy-beta-phenylethylaminoarsenite as a yellow oil.

To a solution of 7.15 parts by weight of diethyl-alpha-carbethoxy-beta-phenyl-ethylaminoarsenite in 80 parts by volume of chloroform there is added 4.18 parts by weight of carbobenzoxyglycine and the solution heated at reflux for two hours. The solution is then cooled, treated with 50 parts by volume of water and filtered to remove the resulting precipitate of arsenic trioxide. The chloroform layer is then separated and concentrated to a thick oil on the steam bath. Treatment of this with saturated sodium bicarbonate solution and numerous water washes causes slow crystallization of carbobenzoxyglycyl-dl-phenylalanine ethyl ester having a melting point of about 92–94° C.

In place of the chlorodiethylarsenite in the above example one may substitute equal molar quantities of other haloarsenites, for instance bromodipropylarsenite, chlorodiamylarsenite and chlorodibenzylarsenite, with good results.

*Example III*

To a solution of 3.65 parts by weight of ethyl dl-valinate hydrochloride and 4.1 parts by weight of triethylamine in 35 parts by volume of chloroform there is added 75 parts by volume of toluene and the resulting precipitate of triethylamine hydrochloride removed by filtration. To the toluene filtrate there is added 4.0 parts by weight of chlorodiethylarsenite and the mixture heated under reflux for about ten minutes. The mixture is then cooled and again filtered to remove triethylamine hydrochloride, leaving a toluene-chloroform solution of diethyl-alpha-carbethoxy-sec.-butylaminoarsenite.

To the above toluene-chloroform solution there is added 4.4 parts by weight of phthalyl-dl-alanine and the solution heated at reflux for one hour. The solution is then concentrated by distillation to about 30 parts by volume and water added to precipitate arsenic trioxide. The toluene layer is separated and concentrated under an air stream to yield ethyl phthalyl-dl-alanyl-dl-valinate as a yellow glass which is crystallized from aqueous alcohol to give a product melting at about 121–123° C.

Example IV

To a solution of 4.08 parts by weight of triethylamine in 60 parts by volume of dry toluene there is added 4.91 parts by weight of ethyl L-tyrosinate hydrochloride and the mixture gently warmed for about ten minutes. To this there is added a solution of 4.01 parts by weight of chlorodiethylarsenite in 10 parts by volume of toluene with stirring. After about fifteen minutes the precipitated triethylamine hydrochloride is removed by filtration leaving a clear solution of L-diethyl-alpha - carbethoxy - beta(p - hydroxyphenyl) ethylaminoarsenite.

To the above solution of L-diethyl-alphacarbethoxy - beta(p - hydroxyphenyl)ethylaminoarsenite there is added 4.18 parts by weight of carbobenzoxyglycine and the solution heated at reflux for one hour and then allowed to stand overnight at room temperature. A heavy oil phase separates. The toluene is removed by vacuum distillation and the oil residue dissolved in 100 parts by volume of ethyl acetate. This solution is washed with water, filtered to remove precipitated arsenic trioxide and then washed with dilute sodium bicarbonate, dilute hydrochloric acid and again with water. The solution is then dried over sodium sulfate and concentrated under an air stream to give ethyl carbobenzoxyglycyl-L-tyrosinate which after recrystallization from ethyl acetate-petroleum ether has a melting point of about 121–123° C.

Example V

Example IV is repeated except that after refluxing one hour the toluene is removed by vacuum distillation and the oil redissolved in 150 parts by volume of chloroform in place of the ethyl acetate of Example IV. A somewhat better yield of ethyl carbobenzoxyglycyl-L-tyrosinate is obtained having a melting point of about 125–126° C. after recrystallization from ethyl acetate-petroleum ether.

Example VI

To a solution of 0.87 part by weight of morpholine and 1.02 parts by weight of triethylamine in about 75 parts by volume of dry toluene there is added portionwise 2.0 parts by weight of chlorodiethylarsenite. After about ten minutes the reaction mixture is cooled and the precipitate of triethylamine hydrochloride removed by filtration leaving a clear solution of diethylmorpholinoarsenite.

To the above solution of diethylmorpholinoarsenite there is added 2.09 parts by weight of carbobenzoxyglycine and the resulting mixture heated at reflux for one hour. The solution is then concentrated in an air stream to give a crystalline residue. This is triturated with 100 parts by volume of dilute sodium hydroxide and the crystalline product removed by filtration and dried. Recrystallization from benzene-petroleum ether gives carbobenzoxyglycylmorpholide as colorless needles having a melting point of about 144–145° C.

Example VII

To a solution of 4.08 parts by weight of triethylamine in 75 parts by volume of toluene there is added 5.72 parts by weight of ethyl glycyl-dl-phenylalanate hydrochloride and the mixture warmed until salt formation is complete. To this there is added a solution of 4.01 parts by weight of diethylchloroarsenite in 10 parts by volume of toluene and the precipitate of triethylamine hydrochloride removed by filtration leaving a clear solution of the diethylarseniteamide of ethyl glycyl-dl-phenylalanate.

The above solution of arsenite amide is diluted to 200 parts by volume with toluene and to this there is added 7.13 parts by weight of carbobenzoxyglycyl-dl-phenylalanine. The solution is then heated at reflux for one hour. Solvent is removed by vacuum distillation, the oil residue redissolved in 150 parts by volume of chloroform and the chloroform solution treated with about 50 parts by volume of water to precipitate arsenic trioxide. The chloroform layer is separated, washed with dilute sodium bicarbonate followed by dilute hydrochloric acid and then dried over sodium sulfate. The resulting solution is concentrated to about 40 parts by volume on a steam bath and then diluted with about 200 parts by volume of petroleum ether to precipitate ethyl carbobenzoxyglycyl - dl - phenylalanylglycyl-dl-phenylalanate as a light yellow solid. After recrystallization from benzene-petroleum ether, followed by washing with ether, the product is obtained as colorless crystals melting at about 130–132° C.

I claim:

1. A method for preparing substituted amides which comprises reacting a carboxylic acid with a diesterarseniteamide said carboxylic acid having no amide-forming acid radical other than carboxyl.

2. A method for preparing substituted amides which comprises reacting, at a temperature of 0–150° C., an alpha-acidamidocarboxylic acid with a diesterarseniteamide.

3. The method of claim 2 wherein said diesterarseniteamide is a derivative of aniline.

4. A method for preparing carbobenzoxyglycylanilide which comprises reacting, at a temperature of 40–110° C., anilinodiethylarsenite with carbobenzoxyglycine.

5. A method for preparing substituted amides which comprises reacting, at a temperature of 0–150° C., a carboxylic acid with a diesterarseniteamide of an aminoacid ester, said carboxylic acid having no amide-forming acid radical other than carboxyl.

6. The method of claim 5 wherein said diesterarseniteamide is a diesterarseniteamide of an ester of phenylalanine.

7. A method for preparing peptides which comprises reacting in an inert solvent at a temperature of 0–150° C. an alpha-acidamidocarboxylic acid with a diesterarseniteamide of an aminoacid ester.

8. The method of claim 7 where said alpha-acidamidocarboxylic acid is a derivative of glycine and said diesterarseniteamide is a derivative of phenylalanine.

9. A method for preparing carbobenzoxyglycyl-dl-phenylalanine ethyl ester which comprises reacting, in an inert solvent at a temperature of 40–110° C., diethyl-alpha-carbethoxy-beta-phenylethylaminoarsenite with carbobenzoxyglycine.

10. The method of claim 7 where said alpha-acidaminocarboxylic acid is a derivative of alanine.

11. A method for preparing ethyl phthalyl-dl-alanyl-dl-valinate which comprises reacting, in an inert solvent at a temperature of 40–110° C., diethyl - alpha - carbethoxy - sec. - butyl - aminoarsenite with phthalyl-dl-alanine.

12. A method of preparing optically active substituted amides which comprises reacting a carboxylic acid with a diesterarseniteamide of an optically active aminoacid ester.

13. A method for preparing optically active peptides without undue racemization which comprises reacting, in an inert solvent at a temperature of 0–150° C., an alpha-acidaminocarboxylic acid with a diesterarseniteamide of an optically active aminoacid ester.

14. A method of preparing ethyl carbobenzoxyglycyl-L-tyrosinate which comprises reacting, in an inert solvent at a temperature of 40–110° C., carbobenzoxyglycine with L-diethyl-alpha-carbethoxy - beta - (p - hydroxyphenyl) - ethylaminoarsenite.

15. A method of preparing peptides which comprises reacting, in an inert solvent at a temperature of 0–150° C., an alpha-acidamidocarboxylic acid with a diesterarseniteamide of an aminoacid amide.

16. A method of preparing ethyl carbobenzoxyglycyl - dl - phenylalanylglycyl - dl - phenylalanate which comprises reacting, in an inert solvent at a temperature of 40–110° C., carbobenzoxyglycyl-dl-phenylalanine with the diethylarseniteamide of ethyl glycyl-dl-phenylalanate.

17. A method of forming an amide linkage which comprises reacting a compound having a free carboxyl group with a diesterarsenite amide, said compound having a carboxyl group having no amide-forming radical other than carboxyl.

JAMES R. VAUGHAN, Jr.

No references cited.